(12) United States Patent
Shimazu

(10) Patent No.: US 10,064,347 B2
(45) Date of Patent: Sep. 4, 2018

(54) PLANT CULTIVATION SYSTEM, AND PLANT CULTIVATION UNIT

(71) Applicant: NEC Solution Innovators, Ltd., Tokyo (JP)

(72) Inventor: Hideo Shimazu, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 307 days.

(21) Appl. No.: 14/777,612

(22) PCT Filed: Feb. 14, 2014

(86) PCT No.: PCT/JP2014/053465
§ 371 (c)(1),
(2) Date: Sep. 16, 2015

(87) PCT Pub. No.: WO2014/156358
PCT Pub. Date: Oct. 2, 2014

(65) Prior Publication Data
US 2016/0286736 A1    Oct. 6, 2016

(30) Foreign Application Priority Data

Mar. 26, 2013    (JP) .................................. 2013-063790

(51) Int. Cl.
*A01G 9/02* (2018.01)
*A01G 9/24* (2006.01)

(52) U.S. Cl.
CPC ............... *A01G 9/24* (2013.01); *A01G 9/243* (2013.01); *A01G 9/246* (2013.01); *Y02A 40/264* (2018.01); *Y02A 40/30* (2018.01)

(58) Field of Classification Search
CPC ... A01G 9/00; A01G 9/14; A01G 9/24; A01G 9/243; A01G 9/246; Y02A 40/243; Y02A 40/30
(Continued)

(56) References Cited

U.S. PATENT DOCUMENTS 4,992,942 A * 2/1991 Bauerle .................. A01G 31/00
700/284
5,493,808 A * 2/1996 Munday ................. A01G 9/246
454/230
(Continued)

FOREIGN PATENT DOCUMENTS

JP       63-91018 A     4/1988
JP     H10-191787 A     7/1998
(Continued)

OTHER PUBLICATIONS

International Search Report, Corresponding to PCT/JP2014/053465, dated May 13, 2014, 2 pages.
(Continued)

*Primary Examiner* — Peter M Poon
*Assistant Examiner* — Ebony E Evans
(74) *Attorney, Agent, or Firm* — Wilmer Cutler Pickering Hale and Dorr LLP

(57) ABSTRACT

A plant cultivation system 100 includes a plurality of plant cultivation units 20, and a management apparatus 30 that manages each plant cultivation unit 20. Each plant cultivation unit 20 includes a greenhouse 1 that serves as a space for plant cultivation, an environment control unit 12 that controls an environment in the greenhouse 1, a storage unit 9 that stores setting values that are control targets for the environment control unit 12 for every number of elapsed days since the cultivation initiating day, and an environment setting instructing unit 10 that sets the setting values stored in the storage unit 9 in the environment control unit 12 in accordance with the number of elapsed days since a cultivation initiating day. The management apparatus 30 sends the setting values for every number of elapsed days since the cultivation initiating day to each of the plant cultivation units 20, causes the storage unit 9 of each of the plant (Continued)

cultivation unit 20 to store the setting values, and gives an instruction for initiating plant cultivation.

4 Claims, 12 Drawing Sheets

(58) Field of Classification Search
USPC .......................................................... 47/17
See application file for complete search history.

(56) References Cited

U.S. PATENT DOCUMENTS

| | | | |
|---|---|---|---|
| 9,357,718 B1* | 6/2016 | Lehman | A01G 31/00 |
| 9,426,950 B2* | 8/2016 | Gidekel | A01G 31/06 |
| 2003/0005626 A1 | 1/2003 | Yoneda et al. | |
| 2008/0120335 A1* | 5/2008 | Dolgoff | G05B 23/0216 |
| 2011/0153053 A1 | 6/2011 | Kim et al. | |
| 2012/0004952 A1* | 1/2012 | Shimoi | G06Q 10/06398 |
| | | | 705/7.42 |
| 2012/0261486 A1* | 10/2012 | Sarver | A01G 25/167 |
| | | | 239/11 |
| 2013/0060473 A1* | 3/2013 | Tomida | A01G 25/167 |
| | | | 702/3 |
| 2014/0144078 A1* | 5/2014 | Gonyer | A01G 31/02 |
| | | | 47/62 A |
| 2014/0325910 A1* | 11/2014 | Faris | A01G 31/06 |
| | | | 47/62 R |
| 2015/0189840 A1* | 7/2015 | Tanizawa | A01G 9/246 |
| | | | 47/17 |
| 2015/0261197 A1* | 9/2015 | Wilkinson | A01G 9/24 |
| | | | 700/276 |
| 2016/0102879 A1* | 4/2016 | Guest | F24F 11/001 |
| | | | 700/276 |

FOREIGN PATENT DOCUMENTS

| | | |
|---|---|---|
| JP | 2003-047340 A | 2/2003 |
| JP | 2005-198661 A | 7/2005 |
| JP | 2006-254775 A | 9/2006 |
| JP | 2010-081877 A | 4/2010 |
| JP | 2012-044873 A | 3/2012 |
| KR | 10-2009-0027279 A | 3/2009 |

OTHER PUBLICATIONS

Extended European Search Report issued in corresponding European Patent Application No. 14773119.4, dated Oct. 27, 2016, 8 pages.
Kamiya, T., et al., "Mobile Phone-Based Field Monitoring for Satsuma Mandarin and Its Application to Watering Advice System," SICE Journal of Control, Measurement, and System Integration, vol. 5, No. 1, pp. 34-40 (Jan. 2012).
Kamiya, T., et al., "A mobile-phone based field logging system for high quality Satsuma Mandarin production," SICE Annual Conference 2011, Waseda University, Tokyo, Japan, pp. 2442-2445 (Sep. 13-18, 2011).

* cited by examiner

Fig.6

Environment setting value
6

| Relative day | Temperature (°C) | Humidity (%) | Solar radiation amount (MJ/m$^2$) |
|---|---|---|---|
| 1 | 20 | 70 | 10 |
| 2 | 20 | 70 | 10 |
| 3 | 20 | 70 | 10 |
| 4 | 18 | 75 | 14 |
| 5 | 18 | 75 | 14 |
| ... | ... | ... | ... |
| 10 | 20 | 70 | 14 |
| 11 | 20 | 70 | 14 |
| ... | ... | ... | ... |

Single unit usage condition
storage unit 32

| Single unit | Usage condition |
|---|---|
| 1 | In use |
| 2 | Not in use |
| 3 | In use |
| 4 | Not in use |
| 5 | Not in use |
| 6 | Not in use |

Single unit usage condition
storage unit 32

| Single unit | Usage condition |
|---|---|
| 1 | In use |
| 2 | In use |
| 3 | In use |
| 4 | In use |
| 5 | In use |
| 6 | Not in use |

Startup initiating day storage unit 36

| Relative day | Actual startup initiating day | Single unit |
|---|---|---|
| 0 | | |
| 5 | | |
| 10 | | |

Startup initiating day storage unit 36

| Relative day | Actual startup initiating day | Single unit |
|---|---|---|
| 0 | 4/1 | 2 |
| 5 | 4/5 | 4 |
| 10 | 4/10 | 5 |

Fig.12

Environment setting value storage unit — 46

| Relative day | Temperature (°C) | Humidity (%) | Solar radiation amount (MJ/m²) | Relative day | Temperature (°C) | Humidity (%) | Solar radiation amount (MJ/m²) | Relative day | Temperature (°C) | Humidity (%) | Solar radiation amount (MJ/m²) | Relative day | Temperature (°C) | Humidity (%) | Solar radiation amount (MJ/m²) |
|---|---|---|---|---|---|---|---|---|---|---|---|---|---|---|---|
| 1 | 25 | 85 | 10 | 1 | 25 | 45 | 10 | 1 | 15 | 85 | 10 | 1 | 15 | 45 | 10 |
| 2 | 25 | 85 | 10 | 2 | 25 | 45 | 10 | 2 | 15 | 85 | 10 | 2 | 15 | 45 | 10 |
| 3 | 25 | 85 | 10 | 3 | 25 | 45 | 10 | 3 | 15 | 85 | 10 | 3 | 15 | 45 | 10 |
| 4 | 25 | 85 | 14 | 4 | 25 | 45 | 14 | 4 | 15 | 85 | 14 | 4 | 15 | 45 | 14 |
| 5 | 25 | 85 | 14 | 5 | 25 | 45 | 14 | 5 | 15 | 85 | 14 | 5 | 15 | 45 | 14 |
| ... | ... | ... | ... | ... | ... | ... | ... | ... | ... | ... | ... | ... | ... | ... | ... |
| 10 | 25 | 85 | 14 | 10 | 25 | 45 | 14 | 10 | 15 | 85 | 14 | 10 | 15 | 45 | 14 |
| 11 | 25 | 85 | 14 | 11 | 25 | 45 | 14 | 11 | 15 | 85 | 14 | 11 | 15 | 45 | 14 |
| ... | ... | ... | ... | ... | ... | ... | ... | ... | ... | ... | ... | ... | ... | ... | ... |
| High temperature/High humidity | | | | High temperature/Low humidity | | | | Low temperature/High humidity | | | | Low temperature/Low humidity | | | |

…

PLANT CULTIVATION SYSTEM, AND PLANT CULTIVATION UNIT

CROSS-REFERENCE TO RELATED APPLICATIONS

The present application is a national stage application of International Application No. PCT/JP2014/053465 entitled "Plant Cultivation System, and Plant Cultivation Unit," filed on Feb. 14, 2014, which claims the benefit of priority from Japanese Patent Application No. JP2013-063790, filed on Mar. 26, 2013, the disclosures of which are incorporated herein in their entirety by reference thereto.

TECHNICAL FIELD

The present invention relates to a plant cultivation system and a plant cultivation unit for cultivating plants under a managed environment.

BACKGROUND ART

In recent years, plant factories have been attracting attention in order to supply safe food and supply foodstuffs year-round (for example, see Patent Documents 1 to 3). In the plant factory, plants are cultivated by a nourishing solution instead of soil, and furthermore plants are grown using natural light and artificial light as light sources, or using only artificial light as a light source.

Moreover, in the plant factory, temperature, humidity, sunshine duration, carbon dioxide amount, and the like are controlled, and an optimal environment for the plants is created, and thus the growth is facilitated. As a result, the plants can be cultivated to a shippable state in a short period of time. Also, the plants to be cultivated can be laid out three dimensionally, and thus the efficiency of utilizing the land can also be increased.

However, a large cost is required to construct and maintain the plant factory. Also, if power supply stops, there is a risk that the plants will die out. Therefore, it is absolutely impossible to supply food for mankind using only plant factories, and the outdoor cultivation of the plants is also important, similarly to the past.

LIST OF PRIOR ART DOCUMENTS

Patent Document

Patent Document 1: JP S63-91018A
Patent Document 2: JP 2010-81877A
Patent Document 3: JP 2012-44873A

DISCLOSURE OF THE INVENTION

Problems to be Solved by the Invention

Meanwhile, in recent years, the number of young people who are newly engaged in agriculture industry has decreased, and thus it is problematic in that farmers do not have sufficient successors. Also, plant cultivation needs various types of know-how, which is also a barrier for a person who newly enters the agriculture industry. Therefore, practical teaching of a method for cultivating plants for the person who newly enters the agriculture industry seems to contribute to solving the problem of successor shortage, but practical teaching has the problems described below.

It is problematic in that, first, when the person who newly enters the agriculture industry is taught the plant cultivation method on-site, it takes time to acquire knowledge if the plant needs a long growing period. For example, rice and tangerine oranges are usually harvested once a year, and thus it takes one year for on-site learning of all of the processes for cultivation. Hereinafter, in the present specification, this problem is referred to as the "temporal difference problem".

Also, there are climatic variations, such as a cold year, drought year, and rainy year, and thus it is problematic in that practical teaching about how to cope with each feature of climatic variations cannot be carried out until such a year comes around. Hereinafter, in the present specification, this problem is referred to as the "variation problem".

Meanwhile, if a person has been engaged in the area of agriculture since a young age (later teens and early twenties), about ten years will have passed when he or she becomes independent, and thus he or she surely has experienced cultivation about ten times. However, it is conceivable that in the future, in the case where the number of persons who enter agriculture industry mid-carrier or after retirement from a company increases, taking a trainee period of ten years can be thought to be a waste of time. Therefore, constructing a mechanism for shortening the period in which cultivation is practically experienced in accordance with natural climate is in demand to facilitate education for a person who newly enters the agriculture industry.

One example of an object of the present invention is to provide a plant cultivation system and a plant cultivation unit that can solve the above-described problems and can realize shortening a teaching period and efficient education of a method for coping with various situations, when a plant cultivation method is taught.

Means for Solving the Problems

In order to achieve the above-described object, a plant cultivation system according to one aspect of the present invention includes a plurality of plant cultivation units and a management apparatus that manages plant cultivation in the plurality of plant cultivation units, wherein each of the plurality of plant cultivation units includes a greenhouse that serves as a space for plant cultivation, an environment control unit that controls an environment in the greenhouse, a storage unit that stores a setting value that is a control target for the environment control unit for every number of elapsed days since a cultivation initiating day, and an environment setting instructing unit that sets the setting value stored in the storage unit in the environment control unit in accordance with the number of elapsed days since the cultivation initiating day; and the management apparatus includes a single unit startup unit that sends the setting values for every number of elapsed days since a cultivation initiating day to each of the plurality of plant cultivation units, causes the storage unit of the plant cultivation unit to store the setting values, and gives an instruction for initiating plant cultivation.

Also, in order to achieve the above-described object, a plant cultivation unit according to one aspect of the present invention includes a greenhouse that serves as a space for plant cultivation, an environment control unit that controls an environment in the greenhouse, a storage unit that stores a setting value that is a control target for the environment control unit for every number of elapsed days since a cultivation initiating day, and an environment setting instructing unit that sets the setting value stored in the storage unit in the environment control unit, in accordance with the number of elapsed days since the cultivation initiating day.

Advantageous Effects of the Invention

As described above, according to the present invention, it is possible to realize shortening of a teaching period and efficient education of a method for coping with various situations, when a plant cultivation method is taught.

BRIEF DESCRIPTION OF THE DRAWINGS

FIG. 6 is a diagram showing one example of environment setting values used in embodiments of the present invention.

FIG. 12 is a diagram showing one example of environment setting values stored in an environment setting value storage unit 46 according to Embodiment 2.

MODE FOR CARRYING OUT THE INVENTION

Summary of the Present Invention

Figure 1:
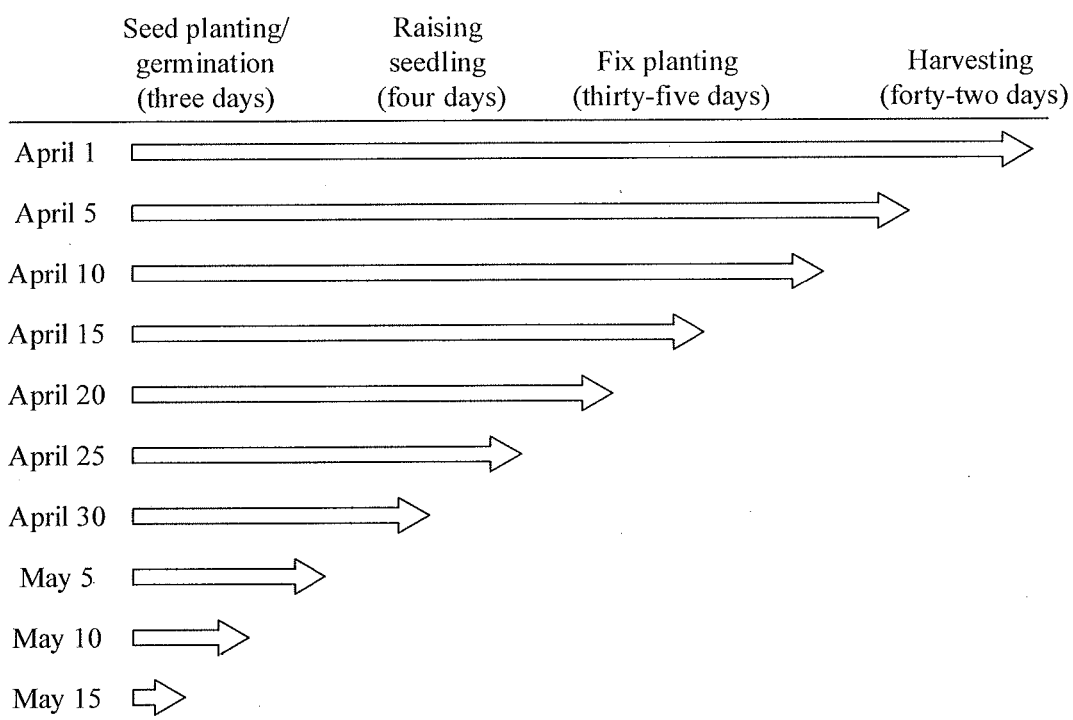
FIG. 1 is a diagram showing one example of a growth state of a plant for each cultivation initiating day.

First, a summary of the present invention will be described using a mechanism for acquiring a license at a driving school as an example. Items that trainees have difficulty in practicing, such as hills, dog-legs (sequential right angle curves), and parallel parking spaces, are arranged in a concentrated manner in a practice field at the driving school. Because there are not many dog-legs or opportunities for parallel parking while driving on a regular road, training cannot be often conducted at such difficult spots when a trainee practices driving on a regular road, whereas many dog-legs and parallel parking spaces are prepared in the small practice field, and thus the trainee can learn techniques for driving at such difficult spots. Therefore, the trainees can experience all situations in skill training and learn a method for coping therewith in about 30 hours.

In view of this, it is assumed that a school for a person who newly enters the agriculture industry will be made in the future, and the person who goes to the school will be referred to as an "agricultural trainee". If the agricultural trainee can learn a necessary technique in skill training for a short period of time, similarly, the trainee can learn necessary skills in the skill training in about several ten hours, and thus many years of training are not required.

Therefore, in the present invention, a plant factory that has been widely used recently is utilized. With the plant factory, plants can be cultivated without being influenced by an external environment, and the plants can be harvested many times per year by efficiently managing the plant factory. For example, in the case of lettuce, the number of instances of harvesting is twice per year for usual outdoor cultivation, whereas in the plant factory, lettuce can be harvested once every approximately fifty days.

Thus, according to a simple calculation, approximately seven times of harvesting is possible per year. Although equipment for the plant factory is mainly for industrial use, in recent years, small equipment has been developed so as to be placed in a restaurant or a convenience store. For example, an "Agri-cube" that DAIWA HOUSE INDUSTRY CO., LTD., which is a house maker, has been sold since 2012, has a width of 4.5 m, a depth of 2.5 m, and a height of 2.6 m, and it is envisioned that the "Agri-cube" is installed inside a house.

Meanwhile, if only one plant factory described above is used, plants can be harvested only once from one cultivation, and thus it is assumed that a plurality of the same plant factories are installed and cultivation of lettuce is initiated under the same cultivation environment with the initiating time of each cultivation being moved by three days, for example. It should be noted that one plant factory is referred to as a "plant cultivation unit" hereinafter.

The cultivation of lettuce needs the cultivation steps of seed planting/germination (three days), raising seedling (four days), a fix planting early period (ten days), a fix planting middle period (ten days), a fix planting latter period (fifteen days), and harvesting (forty-second day). Therefore, immediately before the harvesting of a given plant cultivation unit, other plant cultivation units are respectively in states of the fix planting latter period, fix planting middle period, fix planting early period, raising seedling, and seed planting/germination.

As a result of providing all of the plant cultivation units with the same cultivation environment (temperature, humidity, solar radiation amount, nourishing solution, and the like), the agricultural trainee can observe different growth processes of the same type of lettuce at the same time even though there are slight individual differences between seeds.

FIG. 1 is a diagram showing one example of a growth state of a plant for each cultivation initiating day. For example, as shown in FIG. 1, if ten plant cultivation units are prepared, the cultivation initiating day is moved by five days from April 1, and cultivation is sequentially started under the same external environment, the plant cultivation unit whose cultivation initiating day is April 1 is in the harvesting period on around May 15. On the other hand, the plant cultivation unit whose cultivation initiating day is May 15 is in the seed planting/germination period. Also, the plant cultivation unit whose cultivation initiating day is April 30 is in the raising seedling period. When looking at these ten plant cultivation units on May 15, the agricultural trainee can experience all of the harvest conditions of lettuce at the same time. As a result, the above-described "temporal difference problem" can be solved.

Also, in the case of the plant factory, the cultivation environment can be completely controlled, whereas outdoor cultivation is externally influenced by temperature (cold, hot), the amount of rainfall (heavy rain, little rain), the solar radiation amount (large, little), and the like, and thus different cultivation methods are used therefor.

For example, in the case of fruits such as tangerine oranges, moisture stress is applied thereto (the tree is watered only to the extent that the tree is not weakened) in August in order to increase the sugar content, and a large amount of water is given to the tree from September to October in order to reduce the acidity. Also, such control methods are different depending on the cultivation environment, such as temperature (cold, hot), the amount of rainfall (heavy rain, little rain), and the solar radiation amount (large, little).

Figure 2:
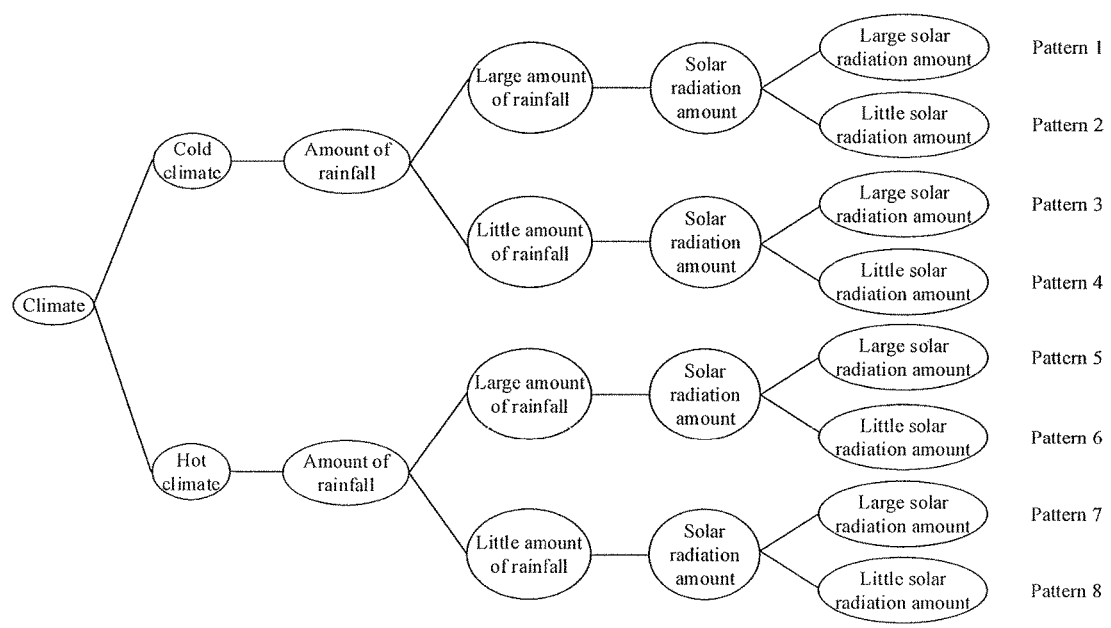
FIG. 2 is a diagram showing one example of patterns envisioned as cultivation environments.

In order for the agricultural trainee to practically experience the cultivation of plants that grow under various cultivation environments in the same period using these plant factory units, it is sufficient that a different cultivation environment pattern is given to each plant cultivation unit to grow the plants. For example, assuming that the cultivation environment is configured by three attributes, namely, a temperature (cold, hot), the amount of rainfall (heavy rain, little rain), and the solar radiation amount (large, little), each attribute is respectively classified into a binary value, or in other words, the temperature is classified into high or low, the humidity is classified into high or low, the solar radiation amount is classified into large or little. In this case, as shown in FIG. 2, there are eight patterns overall. FIG. 2 is a diagram showing one example of patterns envisioned as cultivation environments.

Figure 3:
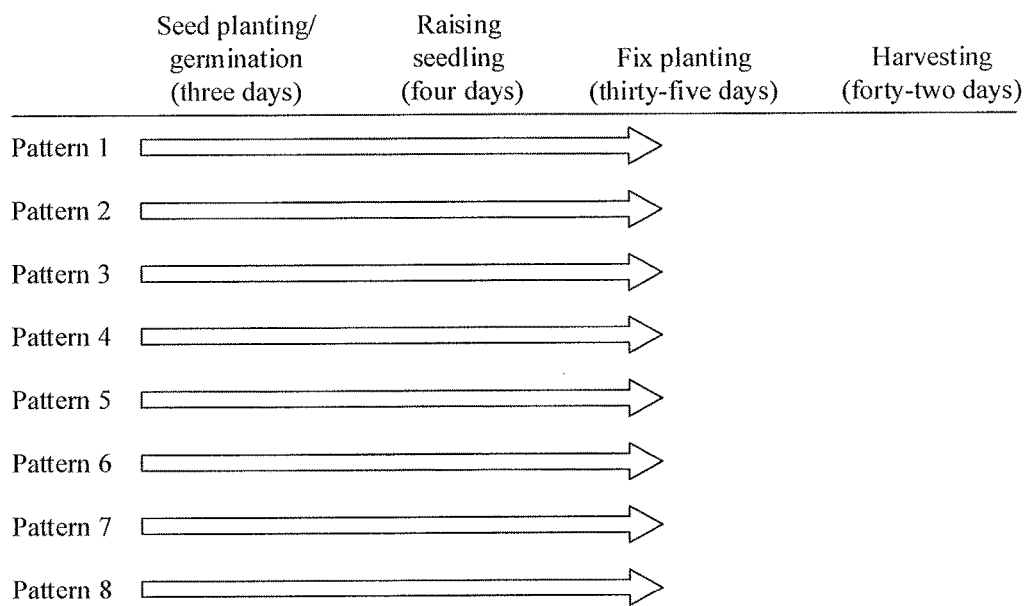
FIG. 3 is a diagram showing one example of growth states of plants for a case where the cultivation initiating days are the same.

As shown in FIG. 3, the cultivation environments having the eight different patterns are respectively applied to eight plant cultivation units, and at the same time, cultivation is started from seed planting/germination. As a result, it is understood that the growth statuses of plants in a given period (around 20th day in FIG. 3) are different from one another in accordance with the patterns. FIG. 3 is a diagram showing one example of growth states of plants for a case where the cultivation initiating days are the same.

Therefore, it is possible to practically check what kind of cultivation is to be performed at this point to achieve the optimal status by harvesting thereafter. Accordingly, because the number of instances of harvesting is two per year in the usual outdoor cultivation, practical experience for each pattern needs at least four years (four years=eight patterns/two times), but with the above method, the agricultural trainee can experience the patterns at the same time. As a result, the above-described "variation problem" can be solved.

It should be noted that ten units are required at the same time to solve the "temporal difference problem" shown in FIG. 1, and eight units are required at the same time to solve the "variation problem" shown in FIG. 3. Therefore, in order to solve both problems at the same time, ninety 10×9) units are required. Although there is a cost-related problem in operating ninety units at the same time, there is possibility in that such a plant cultivation "school" is managed as a business to gather many trainees, and different trainee groups use different units every hour, leading to realization of the business in terms of cost.

Embodiment 1

Hereinafter, a plant cultivation system and a plant cultivation unit according to Embodiment 1 of the present invention will be described with reference to FIGS. 4 to 10.

Overall Configuration

Figure 4:
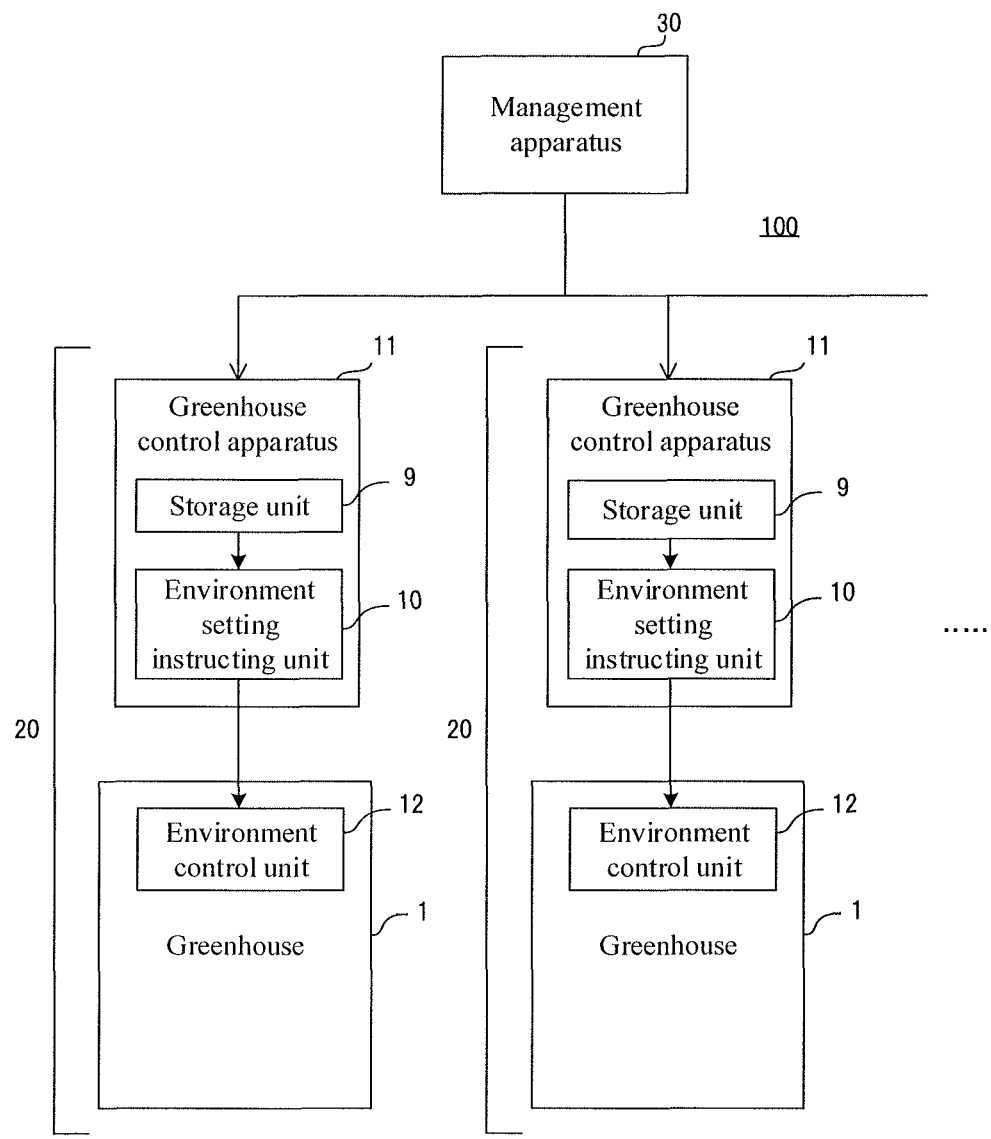
FIG. 4 is a diagram showing a schematic configuration of a plant cultivation system and a plant cultivation unit according to an embodiment of the present invention.

First, schematic configurations of the plant cultivation system and the plant cultivation unit will be described with reference to FIG. 4. FIG. 4 is a diagram showing the schematic configurations of the plant cultivation system and the plant cultivation unit according to the embodiment of the present invention.

As shown in FIG. 4, a plant cultivation system 100 according to Embodiment 1 includes a plurality of plant cultivation units 20 and a management apparatus 30 that manages plant cultivation in the plant cultivation units 20. It should be noted that the number of the plant cultivation units 20 is not particularly limited in the present embodiment.

Also, as shown in FIG. 4, each plant cultivation unit 20 includes a greenhouse 1 that serves as a space for plant cultivation, an environment control unit 12 that controls the environment (temperature, humidity, solar radiation amount, and the like) in the greenhouse 1, and a greenhouse control apparatus 11. Furthermore, the greenhouse control apparatus 11 includes a storage unit 9 and an environment setting instructing unit 10.

In the temperature control apparatus 11, the storage unit 9 stores a setting value that is a control target for the environment control unit 12 for every number of elapsed days since a cultivation initiating day. Also, the environment setting instructing unit 10 sets a setting value stored in the storage unit 9 in the environment control unit 12 in accordance with the number of elapsed days since the cultivation initiating day. Accordingly, the environment control unit 12 controls the environment in the greenhouse 1 using the setting value as a control target.

Also, the management apparatus 30 sends, to each of the plant cultivation units 20, the setting values for every number of elapsed days since the cultivation initiating day, causes the storage unit 9 of each plant cultivation unit 20 to store the setting values, and then gives an instruction for starting plant cultivation thereto.

As described above, in Embodiment 1, the plurality of plant cultivation units that can execute plant cultivation under an arbitrary cultivation environment are used, and furthermore the plant cultivation in these units is managed by the management apparatus 30. Therefore, as will be specifically described below, for each plant cultivation unit, plant cultivation can be executed by changing the plant cultivation initiating day, the cultivation environment, or further changing both the plant cultivation initiating day and the cultivation environment. Thus, according to the present embodiment, it is possible to solve the above-described temporal difference problem and variation problem, and to realize shortening of a teaching period and efficient education of a method for coping with various situations, when a plant cultivation method is taught.

Plant Cultivation Unit

Figure 5:
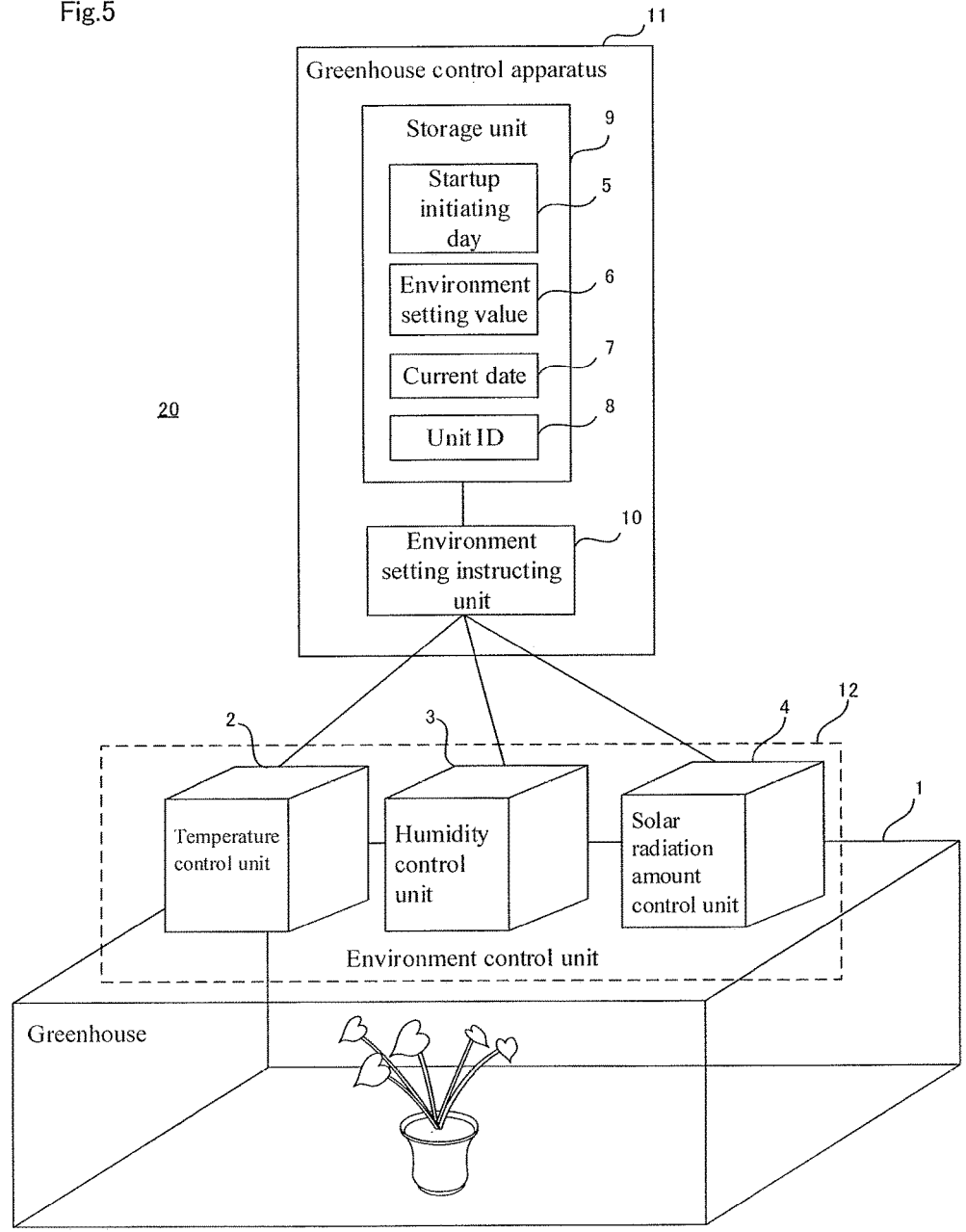
FIG. 5 is a configuration diagram showing a configuration of a plant cultivation unit according to Embodiment 1 of the present invention.

Next, a configuration of the plant cultivation unit according to Embodiment 1 will be described more specifically with reference to FIGS. 5 and 6. FIG. 5 is a configuration diagram showing the configuration of the plant cultivation unit according to Embodiment 1 of the present invention.

First, in Embodiment 1, the greenhouse 1 has a space in which external influences are eliminated, and the cultivation environment in the greenhouse, such as the temperature, humidity, and solar radiation amount, can be kept at setting values, and is formed to have a boxed shape. A material for forming the walls of the greenhouse is not particularly limited as long as the external influences can be sufficiently eliminated by the material. Also, it is sufficient that the size of the space of the greenhouse is set in accordance with the plant to be cultivated.

Also, although the temperature, humidity, and solar radiation amount are mainly used as the cultivation environment in the present embodiment, the cultivation environment is not limited thereto. The cultivation environment may include elements other than these, which can be artificially controlled, such as the amounts of oxygen, carbon dioxide, and air flow.

Furthermore, in the present embodiment, the environment control unit 12 includes a temperature control unit 2, a humidity control unit 3, and a solar radiation amount control unit 4. Among these units, the temperature control unit 2 is configured by an apparatus that adjusts the temperature in the greenhouse in accordance with an instruction from the outside. Specifically, examples of the temperature control unit 2 include an air conditioner. Also, in the case where the plant cultivation unit 20 is installed in an area where the temperature is relatively high, the temperature control unit 2 may be a cooler. Furthermore, in the case where the plant cultivation unit 20 is installed in a cold area, the temperature control unit 2 may be a heater. In addition, the temperature control unit 2 may be configured by both the cooler and heater, and there is no particular limitation on the configuration of the temperature control unit 2.

Also, the humidity control unit 3 is configured by an apparatus that adjusts the humidity in the greenhouse in accordance with an instruction from the outside. Specifically, similarly to the temperature control unit 2, examples of the humidity control unit 3 also include an air conditioner. Therefore, one air conditioner can also be used as the temperature control unit 2 and the humidity control unit 3. It should be noted that the humidity control unit 3 may also be an apparatus other than the air conditioner.

The solar radiation amount control unit 4 is configured by an apparatus that adjusts the solar radiation amount in the greenhouse in accordance with an instruction from the outside. Specifically, examples of the solar radiation amount control unit 4 include a light source such as a halogen lamp. Also, in the case where the plant cultivation unit 20 is installed in an area where the solar radiation amount is stable, the solar radiation amount control unit 4 may be an apparatus that opens and closes a window provided in the greenhouse 1. In this case, the solar radiation amount is adjusted by how much the window is opened/closed, or the period of time for which the window is open.

Also, as shown in FIG. 5, in Embodiment 1, as will be described later, the storage unit 9 stores, as information, a startup initiating day 5, a current date 7, and a unit ID 8 in addition to setting values (hereinafter, referred to as "environment setting values") 6 for every number of elapsed days since the cultivation initiating day.

The startup initiating day 5 is the day on which plant cultivation is initiated in the plant cultivation unit 20. The startup initiating day 5 is set by a user via the management apparatus 30. Using the startup initiating day 5 as a standard, the temperature is controlled by the temperature control unit 2, the humidity is controlled by the humidity control unit 3, and the solar radiation amount is controlled by the solar radiation amount control unit 4 everyday.

The environment setting values 6 are setting values for the temperature, humidity, and solar radiation amount that are set for every number of relative elapsed days since the startup initiating day, and are control targets (instruction values) for each control unit. FIG. 6 is a diagram showing one example of environment setting values used in the embodiment of the present invention. In FIG. 6, "relative day" indicates the number of elapsed days since the cultivation initiating day (startup initiating day).

Also, in the example of FIG. 6, a temperature of 20° C., a humidity of 70%, an integrated solar radiation amount of 10 MJ/m$^2$ (converted based on a month) are set as the environment setting values during the seed planting/germination period (three days from the startup initiating day). Also, a temperature of 18° C., a humidity of 75%, an integrated solar radiation amount of 14 MJ/m$^2$ (converted based on a month) are set as the environment setting values during the raising seedling period (after the fourth day from the startup initiating day). Also, a temperature of 20° C., a humidity of 70%, an integrated solar radiation amount of 14 MJ/m$^2$ (converted based on a month) are set as the environment setting values during the fix planting early period (after the tenth day from the startup initiating day). Also, in Embodiment 1, the environment setting values 6 are defined by the user in advance based on knowledge and experience relating to the plants to be cultivated.

Also, the current date 7 is the current (today's) date, and is updated daily by a clock function of a computer that configures the temperature control apparatus 11, for example. It should be noted that the current date 7 may be acquired by the environment setting instructing unit 10 using the clock function of the computer as needed without being stored in the storage unit 9.

The unit ID 8 is an identifier for identifying the plant cultivation unit 20, and is uniquely set by the user. It should be noted that one plant cultivation unit 20 is also referred to as a "single unit" 20 hereinafter.

In Embodiment 1, the environment setting instructing unit 10 automatically starts up once a day, and references the current date 7, the startup initiating day 5, and the environment setting values 6 stored in the storage unit 9 to specify the control targets corresponding to the today's date, or in other words, the setting values for the temperature, humidity, and solar radiation amount, and then gives instructions to the temperature control unit 2, the humidity control unit 3, and the solar radiation amount control unit 4. It should be noted that processing in the environment setting instructing unit 10 ends after the instructions are given.

According to such a plant cultivation unit 20, the cultivation environment such as the temperature, humidity, and solar radiation amount can be controlled, and thus it is possible to realize a greenhouse in which a natural environment is imitated. Thus, it is possible to artificially construct an environment for practically testing a "method for coping with the case where a hot day (alternatively, little rain and the like) continues more than usual" to cope with climate variations that will accompanying future global warming. Accordingly, the agricultural trainee can efficiently learn the cultivation method in such an exceptional environment.

Management Apparatus

Figure 7:
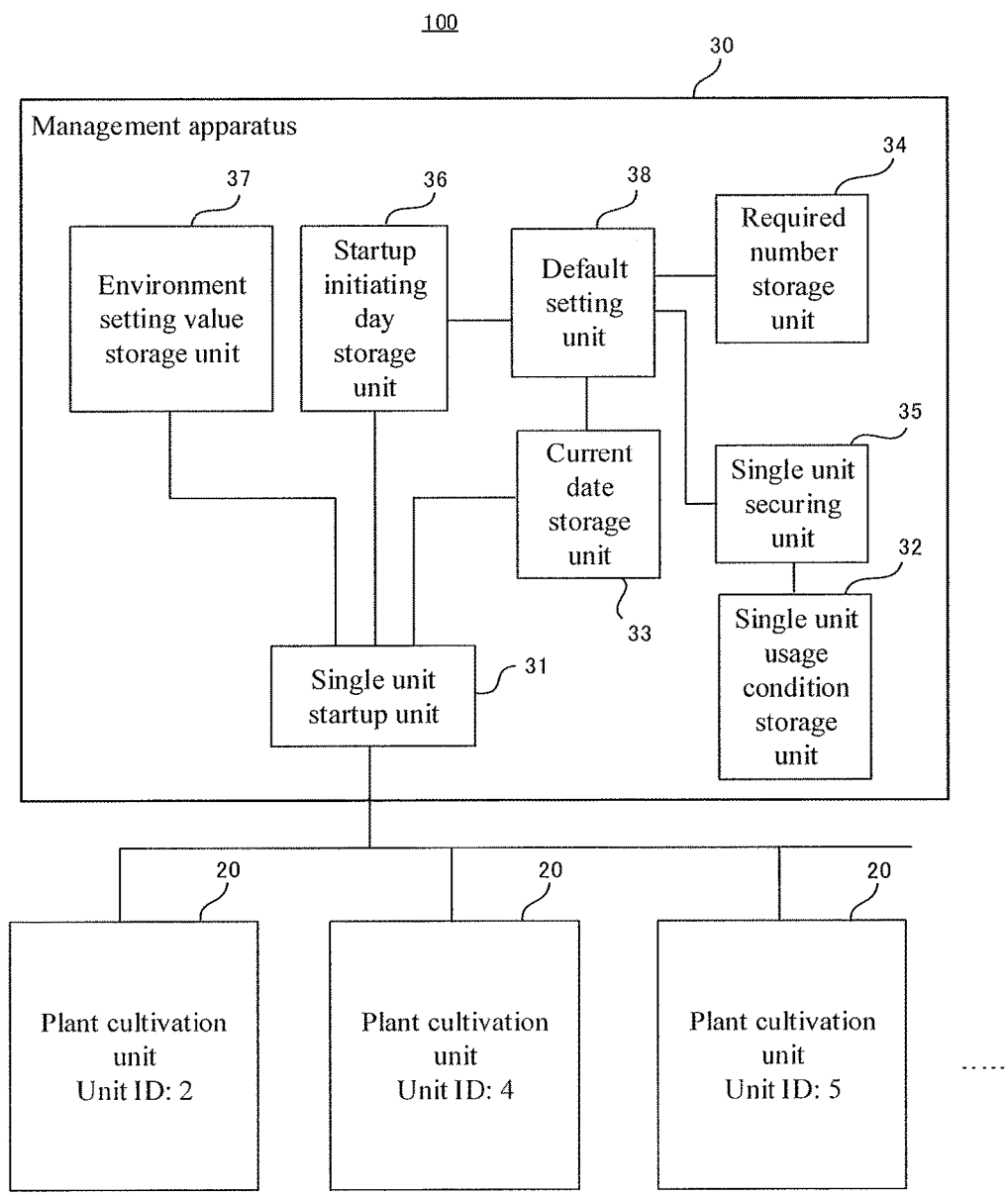
FIG. 7 is a configuration diagram showing a configuration of a management apparatus provided for the plant cultivation unit according to Embodiment 1 of the present invention.

Next, the management apparatus 30 that configures the plant cultivation unit according to Embodiment 1 will be specifically described with reference to FIGS. 7 to 10. FIG. 7 is a configuration diagram showing a configuration of the management apparatus provided for the plant cultivation unit according to Embodiment 1 of the present invention.

As shown in FIG. 7, the management apparatus 30 includes a single unit startup unit 31, a single unit usage condition storage unit 32, a current date storage unit 33, a required number storage unit 34, a single unit securing unit 35, a startup initiating day storage unit 36, an environment setting value storage unit 37, and a default setting unit 38. It should be noted that although a plurality of plant cultivation units 20 are shown also in FIG. 7, details thereof are omitted.

Figure 8:
FIG. 8 is a diagram showing one example of information stored in a single unit usage condition storage unit according to Embodiment 1 of the present invention.

The single unit usage condition storage unit 32 stores the usage condition of each single unit as shown in FIG. 8. FIG. 8 is a diagram showing one example of information stored in the single unit usage condition storage unit according to Embodiment 1 of the present invention.

Specifically, the single unit usage condition storage unit 32 stores data having a table structure in which an item "single unit" and an item "usage condition" forms one record. Also, the unit ID 8 (see FIG. 5) of the plant cultivation unit 20 to be used is registered in the item "single unit" in the table.

A value indicating that the single unit is "in use" is registered in the item "usage condition" when the single unit corresponding to the ID is currently "in use", and a value indicating that the single unit is "not in use" is registered therein when the single unit is not in use. Also, the arrow in FIG. 8 indicates a change in the usage condition, and indicates a situation in which the value registered in the item "usage condition" changes in accordance with the usage condition.

Also, although the value "not in use" is registered in all of the items "usage condition" of the single unit usage condition storage unit 32 when the operation is initiated, the value is rewritten to "in use" by the single unit securing unit 35 that is described later every time a single unit is used. Also, when usage of the single unit ends, the user rewrites the value to "not in use".

The required number storage unit 34 stores the required number of the single units 20 calculated by the user. For example, in Embodiment 1, in order to solve the temporal difference problem, the user calculates the number of required units in advance when sequentially initiating the cultivation of a given plant with temporal differences.

Upon receiving an instruction indicating that a specific number of single units 20 are to be secured from the default setting unit 38 that is described later, the single unit securing unit 35 references the single unit usage condition storage unit 32 to specify the unit ID having a value of currently "not in use". Then, the single unit securing unit 35 rewrites the usage condition corresponding to the specified unit ID to "in use", and returns the specified unit ID to the default setting unit 38.

Figure 9:
FIG. 9 is a diagram showing one example of information stored in a startup initiating day storage unit according to Embodiment 1 of the present invention.

As shown in FIG. 9, the startup initiating day storage unit 36 stores three items, namely, a "relative day", an "actual startup initiating day", and an "allocated single unit", as one record. FIG. 9 is a diagram showing one example of information stored in a startup initiating day storage unit according to Embodiment 1 of the present invention.

Also, as shown in FIG. 9, the days when the plurality of single units that are to be sequentially started up with temporal differences are started up are stored in the item "relative day" as values expressed by the number of relative days elapsed since the startup initiating day for the single unit that is first started up. The date on which startup of the single unit is actually initiated (cultivation initiating date) is stored in the item "actual startup initiating day". The unit ID of a single unit that is to be allocated is stored in the item "allocated single unit".

Moreover, as shown in the upper portion of FIG. 9, before the instruction for initiating the startup is actually received, the number of relative days elapsed since the startup first day is registered in only the item "relative day" and the remaining items have blank spaces. Specifically, numbers 0, 5, and 10 are respectively registered in the items "relative day". These numbers respectively mean "startup after the elapse of zero day since the startup initiating day (startup on the same day)", "startup after five days since the startup initiating day", and "startup after ten days since the startup initiating day". The writing of the values of the remaining two items will be described along with the description of the default setting unit 38.

The environment setting value storage unit 37 daily stores setting values that are control targets based on the method of counting the number of relative elapsed days since the startup initiating day, or in other words, stores values that are to be set as a temperature, humidity, and solar radiation amount. The setting values stored in the environment setting value storage unit 37 are similar to the environment setting values 6 shown in FIG. 6, and have the same data configuration. Therefore, the single unit startup unit 31 that is described later can copy the values of the environment setting value storage unit 37 in the storage unit 9 of the single unit 20, as the environment setting values 6.

The default setting unit 38 sets cultivation initiating days in the plurality of units 20 such that the cultivation initiating days are different from one another. Specifically, upon receiving the instruction for initiating the startup from the user, the default setting unit 38 first retrieves the number of required units from the required number storage unit 34, sends the required number of units to the single unit securing unit 35 to instruct the securing of the single units. Next, upon receiving the unit IDs from the single unit securing unit 35, the default setting unit 38 registers these IDs one by one in the item "single unit" of the startup initiating day storage unit 36 (see FIG. 9).

Next, the default setting unit 38 retrieves the value of the item "relative day" corresponding to each registered unit ID, and adds the current date stored in the current date storage unit 33 to the retrieved value to register the resulting added value in the item "actual startup initiating day" of the startup initiating day storage unit 36. Accordingly, the cultivation initiating days in the plurality of single units 20 are set.

Specifically, if the value of April 1 is stored in the current date storage unit 33, as shown in FIG. 9, the default setting unit 38 calculates 4/1, 4/5, and 4/10 corresponding to the zeroth day, fifth day, and tenth day based on the stored values, and then respectively registers the calculated values in the item "actual startup initiating day".

Also, it is assumed that the default setting unit 38 receives the unit IDs 2, 4, and 5 from the single unit securing unit 35 at this time. Accordingly, as shown in FIG. 8, the usage conditions of the single units 2, 4, and 5 are rewritten from "not in use" to "in use" in the single unit usage condition storage unit 32 (see FIG. 8).

Also, the default setting unit 38 registers the unit IDs received from the single unit securing unit 35 in the item "single unit" of the startup initiating day storage unit 36. As a result, the state of the startup initiating day storage unit 36 is a state after the change that is shown in the lower portion in FIG. 9 and that is located at the tip of the arrow. It should be noted that in FIG. 9, the order of the unit IDs 2, 4, and 5 is arbitrary, and the unit IDs may be set in the order of 4, 5, and 2. This is because that each single unit has the same function and capability.

The single unit startup unit 31 specifies the corresponding startup initiating day for each of the single units 20, furthermore sends the environment setting values thereto, causes the storage unit 9 of the single unit 20 to store the environment setting values, and gives an instruction for initiating plant cultivation.

Specifically, the single unit startup unit 31 first periodically starts up everyday, and retrieves one by one the records stored in the startup initiating day storage unit 36 to check the value of the item "actual startup initiating day". Next, in the case where the value of the item "actual startup initiating day" and the current date stored in the current date storage unit 33 match, the single unit startup unit 31 specifies the unit ID stored in the item "single unit" of the record in which the actual startup initiating day matches the current day.

Next, the single unit startup unit 31 transmits the environment setting values stored in the environment setting value storage unit 37 to the corresponding single unit 20 for each specified single unit ID, then causes the storage unit 9 thereof to store the transmitted values, and gives an instruction for initiating the startup to the environment setting instructing unit 10 (see FIG. 5).

Figure 10:
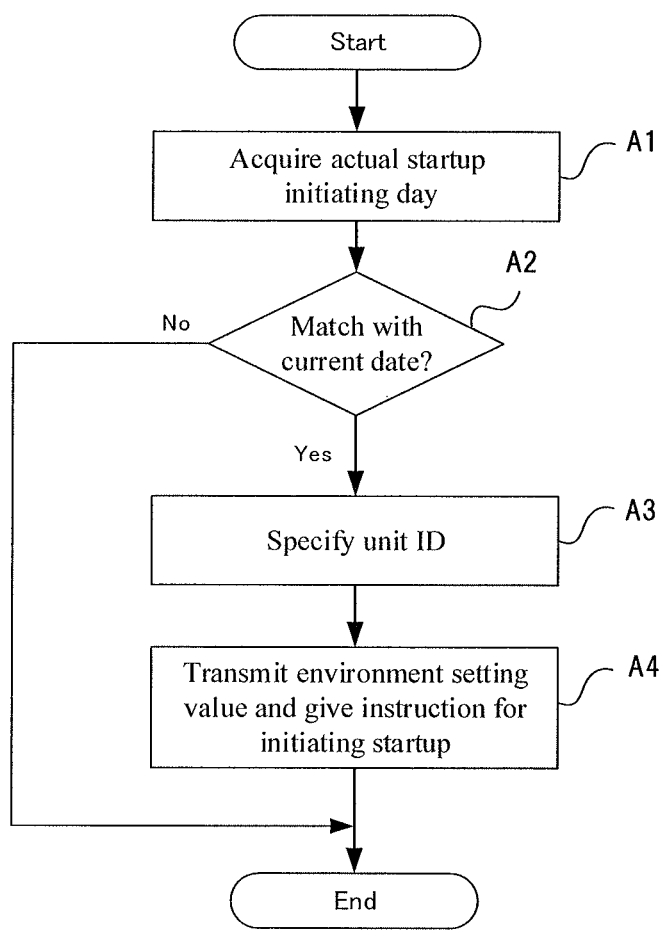
FIG. 10 is a flow diagram showing operations of the management apparatus that is provided for the plant cultivation unit according to Embodiment 1 of the present invention.

Here, operations of the management apparatus 30 will be described with reference to FIG. 10. FIG. 10 is a flow diagram showing operations of the management apparatus provided for the plant cultivation unit according to Embodiment 1 of the present invention.

As shown in FIG. 10, the single unit startup unit 31 first periodically starts up everyday, and retrieves one by one the records stored in the startup initiating day storage unit 36 to check the value of the item "actual startup initiating day" (step A1).

Next, the single unit startup unit 31 determines whether or not the value of the item "actual startup initiating day" and the current date stored in the current date storage unit 33 match (step A2). If the result of the determination is that they do not match, the single unit startup unit 31 ends this processing. On the other hand, if the determination is that they match, the single unit startup unit 31 specifies the unit ID stored in the item "single unit" of the record in which the actual startup initiating day and the current date match (step A3).

For example, when the single unit startup unit 31 starts up, if the date is 4/1, 4/5, or 4/10, the startup initiating day storage unit 36 has a record in which a match is found as shown in FIG. 9, and thus the single unit startup unit 31 specifies the unit ID registered in the item "single unit".

Next, the single unit startup unit 31 starts up the greenhouse control apparatus 11 of the corresponding single unit. Thereafter, the single unit startup unit 31 copies the values of the environment setting values 6 required at the time of starting up the greenhouse control apparatus 11 from the environment setting value storage unit 37, and further copies the current date value into the value of the startup initiating day 5 of the corresponding unit ID (step A4).

When steps A1 to A4 are executed, the temperature control apparatus 11 initiates the startup in the corresponding single unit 20. Hereinafter, in each single unit, the greenhouse control apparatus 11 separately executes the control of a temperature, humidity, and illuminance everyday while referencing the environment setting values 6.

As described above, according to the plant cultivation system in Embodiment 1, when learning the cultivation of one type of crop, the agricultural trainee can experience the cultivation from the beginning to the end at the same time without waiting for one round of the cultivation (for example: in the case of lettuce, forty-two days for seed planting/germination, raising seedling, fix planting, and harvesting). In other words, the agricultural trainee can experience all the processes of seed planting/germination, raising seedling, fix planting, and harvesting in one day.

Embodiment 2

Next, a plant cultivation system and a plant cultivation unit according to Embodiment 2 of the present invention will be described with reference to FIGS. 11 and 12.

In a plant cultivation system 110 according to Embodiment 2, a plant cultivation unit (single unit) 20 is similar to the plant cultivation unit 20 shown in FIGS. 4 and 5 in Embodiment 1. Embodiment 2 is different from Embodiment 1 in the configuration of a management apparatus 40. Hereinafter, Embodiment 2 will be described, focusing on differences from Embodiment 1.

Figure 11:
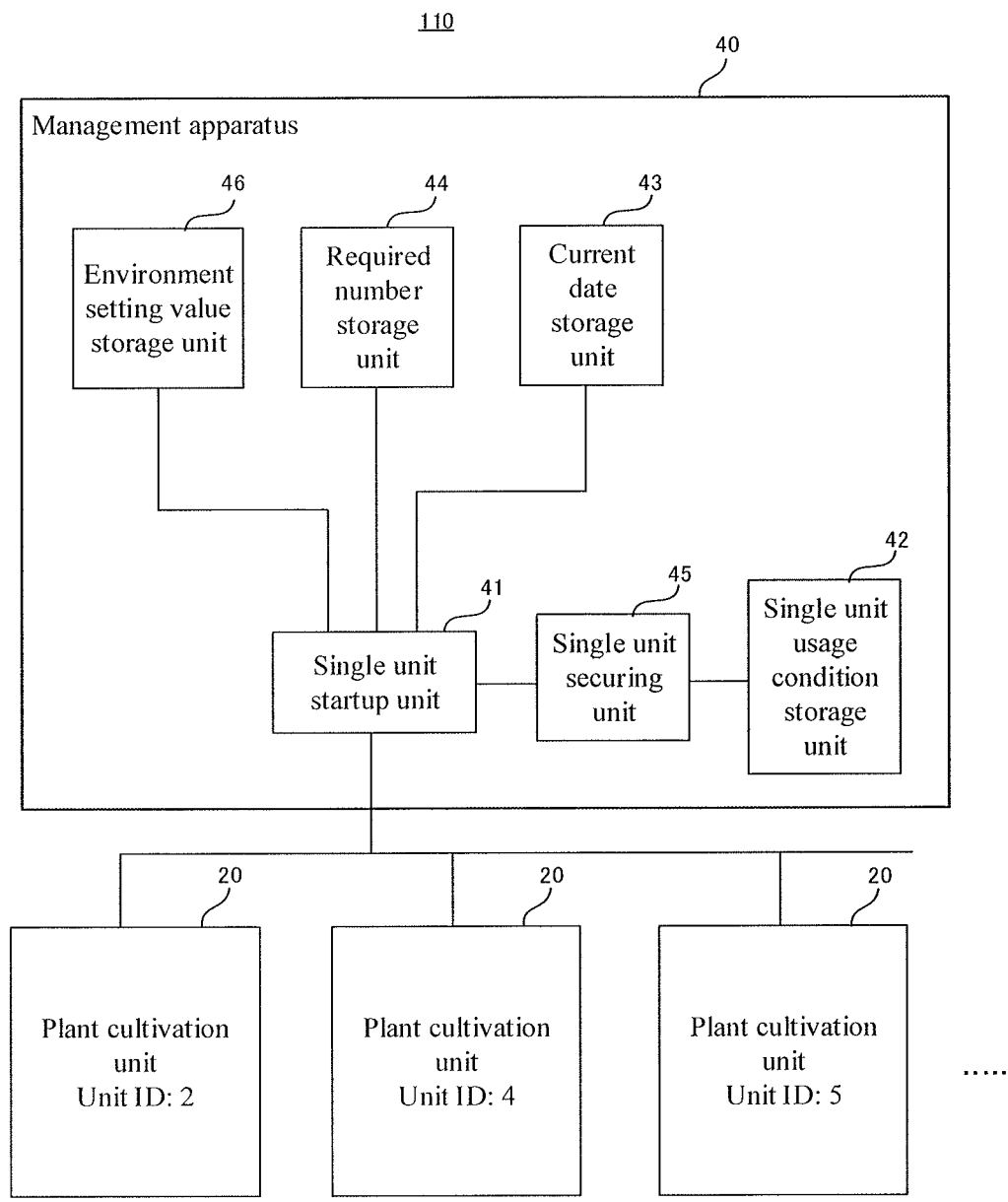
FIG. 11 is a configuration diagram showing a configuration of a management apparatus that is provided for a plant cultivation unit according to Embodiment 2 of the present invention.

FIG. 11 is a configuration diagram showing a configuration of the management apparatus provided for the plant cultivation unit according to Embodiment 2 of the present invention. As shown in FIG. 11, in Embodiment 2, the management apparatus 40 includes a single unit startup unit 41, a single unit usage condition storage unit 42, a current date storage unit 43, a required number storage unit 44, a single unit securing unit 45, and an environment setting value storage unit 46.

Among these units, the single unit usage condition storage unit 42, the current date storage unit 43, the required number storage unit 44, and the single unit securing unit 45 are respectively similar to the single unit usage condition storage unit 32, the current date storage unit 33, the required number storage unit 34, and the single unit securing unit 35 that are shown in FIG. 7.

Meanwhile, in Embodiment 2, the environment setting value storage unit 46 stores multiple types of environment setting values (setting values for every number of elapsed days since the cultivation initiating day) that are set such that the cultivation environments for plants are different from one another. In other words, whereas only the startup initiating day is different for each single unit 20 and only one type of cultivation environment is given in Embodiment 1, environment setting values in which different temperatures, humidities, and solar radiation amounts are defined are respectively sent to each of the single units 20 in Embodiment 2. Therefore, the number of environment setting values that are prepared matches the number of the single units 20 that are to be used. It should be noted that the environment setting values in the single units 20 are set by a user, and stored in the environment setting value storage unit 46.

FIG. 12 is a diagram showing one example of the environment setting values stored in the environment setting value storage unit 46 in Embodiment 2. As shown in FIG. 12, in Embodiment 2, multiple types of environment setting values that are set such that the cultivation environments for plants are different from one another are stored in the environment setting value storage unit 46.

Also, in Embodiment 2, the single unit startup unit 41 divides the plurality of single units 20 into the same number of groups as the number of types of environment setting values, and transmits the corresponding type of environment setting values to each group.

Specifically, upon receiving an instruction for initiating the startup from the user, the single unit startup unit 41 first requests the single unit securing unit 45 to secure one single unit 20, and receives the unit ID thereof. Next, the single unit startup unit 41 retrieves one type of environment setting values corresponding to the received unit ID from the environment setting value storage unit 46.

Subsequently, the single unit startup unit 41 transmits the retrieved environment setting values to the single unit 20 having the received unit ID, causes the storage unit 9 thereof to store the transmitted values, and gives an instruction for initiating the startup to the environment setting instructing unit 10 (see FIG. 5).

Also, the single unit startup unit 41 repeatedly executes the above-described processing the same number of times as the value stored in the required number storage unit 44. After the single unit startup unit 41 gives the startup instruction to the greenhouse control apparatuses 11 (see FIG. 5) of the plurality of single units 20, individual greenhouse control apparatuses 11 independently execute temperature control, humidity control, and solar radiation amount control in accordance with the given environment setting values. Therefore, the single unit startup unit 41 only plays a role at the time of the startup.

Also, in Embodiment 2, as shown in FIG. 12, there are four types of environment setting values, namely, high temperature/high humidity, high temperature/low humidity, low temperature/high humidity, and low temperature/low humidity. In the example of FIG. 12, the solar radiation amount is set to the same value.

Also, as shown in FIG. 12, the four types of environment setting values stored in the environment setting value storage unit 46 set the temperature, humidity, and solar radiation amount daily such that different cultivation environments are realized. Upon receiving the instruction for initiating the startup from the user, the single unit startup unit 41 divides the single units 20 into four groups, and transmits the different environment setting values to each group.

As described above, according to the plant cultivation system in Embodiment 2, when learning the cultivation of one crop, the agricultural trainee can experience differences in cultivation methods resulting from differences in the cultivation environment (temperature, humidity, solar radiation amount, and the like) at the same time without performing multiple rounds of cultivation (for example: in the case of lettuce, multiple rounds of forty-two days). For example, the agricultural trainee can experience a fix planting method under a usual climate at the same time as a fix planting method under a hotter climate than usual (cold climate, larger solar radiation amount climate, little solar radiation amount climate, and the like), and thus can accumulate experience very efficiently.

Although the above-described embodiments can be partially or wholly represented by Supplementary Note 1 to Supplementary Note 6 described below, the present invention is not limited to the following description.

Supplementary Note 1

A plant cultivation system comprising:
a plurality of plant cultivation units; and
a management apparatus that manages plant cultivation in the plurality of plant cultivation units,
wherein each of the plurality of plant cultivation units includes:
 a greenhouse that serves as a space for plant cultivation;
 an environment control unit that controls an environment in the greenhouse;
 a storage unit that stores a setting value that is a control target for the environment control unit for every number of elapsed days since a cultivation initiating day; and
 an environment setting instructing unit that sets the setting value stored in the storage unit in the environment control unit, in accordance with the number of elapsed days since the cultivation initiating day, and
the management apparatus includes
a single unit startup unit that sends the setting values for every number of elapsed days since a cultivation initiating day to each of the plurality of plant cultivation units, causes the storage unit of the plant cultivation unit to store the setting values, and gives an instruction for initiating plan cultivation.

Supplementary Note 2

The plant cultivation system according to Supplementary Note 1, wherein
the management apparatus further includes a default setting unit that sets cultivation initiating days in the plurality of plant cultivation units such that the cultivation initiating days are different from one another, and
for each of the plurality of plant cultivation units, the single unit startup unit specifies the corresponding initiating day and sends the setting values for every number of elapsed days since the cultivation initiating day.

Supplementary Note 3

The plant cultivation system according to Supplementary Note 1, wherein
the management apparatus includes an environment setting value storage unit that stores a plurality of types of setting values for every number of elapsed days since a cultivation initiating day, the plurality of types being set so as to realize different plant cultivation environments, and
the single unit startup unit divides the plurality of plant cultivation units into the same number of groups as the number of types of setting values, and sends the corresponding type of setting values for every number of elapsed days since a cultivation initiating day to each group.

Supplementary Note 4

The plant cultivation system according to Supplementary Note 1, wherein
in the plurality of plant cultivation units,
the environment control unit includes a temperature control unit that controls a temperature in the greenhouse, a humidity control unit that controls a humidity in the greenhouse, and a solar radiation amount control unit that controls a solar radiation amount in the greenhouse, and
the storage unit stores a target temperature, a target humidity, and a target solar radiation amount for every number of elapsed days since a cultivation initiating day, as the setting values.

Supplementary Note 5

A plant cultivation unit comprising:
a greenhouse that serves as a space for plant cultivation;
an environment control unit that controls an environment in the greenhouse;
a storage unit that stores a setting value that is a control target for the environment control unit for every number of elapsed days since a cultivation initiating day; and
an environment setting instructing unit that sets the setting value stored in the storage unit in the environment control unit, in accordance with the number of elapsed days since the cultivation initiating day.

Supplementary Note 6

The plant cultivation unit according to Supplementary Note 5, wherein
the environment control unit includes a temperature control unit that controls a temperature in the greenhouse, a humidity control unit that controls a humidity in the greenhouse, and a solar radiation amount control unit that controls a solar radiation amount in the greenhouse, and
the storage unit stores a target temperature, a target humidity, and a target solar radiation amount for every number of elapsed days since a cultivation initiating day, as the setting values.

Although the present invention has been described with reference to embodiments, the present invention is not limited to the above-described embodiments. The configuration and details of the present invention can be modified in various ways comprehendible by a person skilled in the art within the scope of the present invention.

This application is based upon and claims the benefit of Japanese Patent Application No. 2013-063790, filed Mar. 26, 2013, the disclosure of which is incorporated herein in its entirety by reference.

INDUSTRIAL APPLICABILITY

As described above, according to the present invention, it is possible to realize shortening of a teaching period and efficient education of a method for coping with various situations when a plant cultivation method is taught. The present invention is useful for the case where the agricultural practical training is performed.

REFERENCE SIGNS LIST

1 Greenhouse
2 Temperature control unit
3 Humidity control unit
4 Solar radiation amount control unit
5 Startup initiating day
6 Environment setting value
7 Current date
8 Unit ID
9 Storage unit
10 Environment setting instructing unit
11 Temperature control apparatus
12 Environment control unit
20 Plant cultivation unit (single unit)
30 Management apparatus
31 Single unit startup unit
32 Single unit usage condition storage unit
33 Current date storage unit
34 Required number storage unit
35 Single unit securing unit
36 Startup initiating day storage unit
37 Environment setting value storage unit
38 Default setting unit
41 Single unit startup unit
42 Single unit usage condition storage unit
43 Current date storage unit
44 Required number storage unit
45 Single unit securing unit
46 Environment setting value storage unit
100 Plant cultivation system

The invention claimed is:

1. A plant cultivation system comprising:
a plurality of plant cultivation units; and
a management apparatus that manages plant cultivation in the plurality of plant cultivation units,
wherein each of the plurality of plant cultivation units includes:
  a greenhouse that serves as a space for plant cultivation;
  an environment controller that controls an environment in the greenhouse;
  a storage unit that stores a setting value that is a control target for the environment controller for every number of elapsed days since a cultivation initiating day; and
  an environment setting instructing unit that sets the setting value stored in the storage unit in the environment control unit, in accordance with the number of elapsed days since the cultivation initiating day, and
the management apparatus includes
  a single unit startup unit that sends the setting values for every number of elapsed days since a cultivation initiating day to each of the plurality of plant cultivation units, causes the storage unit of the corresponding plant cultivation unit to store the setting values, and gives an instruction for initiating plant cultivation;
  a single unit usage condition storage unit that stores a usage condition of each plant cultivation unit;
  a required number storage unit that stores a required number of the plant cultivation unit which are necessary for cultivation of the plant; and
  a single unit securing unit configured to specify a plant cultivation unit which is not used based on the usage condition stored by the single unit usage condition storage unit, and set the usage condition of the plant cultivation unit specified to be in use according to the required number of the plant cultivation unit.

2. The plant cultivation system according to claim 1, wherein
the management apparatus further includes a default setting unit that sets cultivation initiating days in the plurality of plant cultivation units such that the cultivation initiating days are different from one another, and
for each of the plurality of plant cultivation units, the single unit startup unit specifies the corresponding initiating day and sends the setting values for every number of elapsed days since the cultivation initiating day.

3. The plant cultivation system according to claim 1, wherein
the management apparatus includes an environment setting value storage unit that stores a plurality of types of setting values for every number of elapsed days since a cultivation initiating day, the plurality of types being set so as to realize different plant cultivation environments, and
the single unit startup unit divides the plurality of plant cultivation units into the same number of groups as the number of types of setting values, and sends the corresponding type of setting values for every number of elapsed days since a cultivation initiating day to each group.

4. The plant cultivation system according to claim 1, wherein in the plurality of plant cultivation units,
the environment control unit includes a temperature control unit that controls a temperature in the greenhouse, a humidity control unit that controls a humidity in the greenhouse, and a solar radiation amount control unit that controls a solar radiation amount in the greenhouse, and
the storage unit stores a target temperature, a target humidity, and a target solar radiation amount for every number of elapsed days since a cultivation initiating day, as the setting values.

* * * * *